United States Patent
Peter

(10) Patent No.: US 6,907,965 B2
(45) Date of Patent: Jun. 21, 2005

(54) PARK BREAK SYSTEM FOR VEHICLES

(75) Inventor: Cornelius Peter, Bühl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 130 days.

(21) Appl. No.: 10/072,760

(22) Filed: Feb. 8, 2002

(65) Prior Publication Data

US 2002/0129999 A1 Sep. 19, 2002

(30) Foreign Application Priority Data

Feb. 9, 2001 (DE) .......................................... 101 05 933

(51) Int. Cl.$^7$ .............................................. F16D 65/36
(52) U.S. Cl. ...................... 188/156; 188/72.8; 188/2 D; 74/502.4; 74/501.5 R
(58) Field of Search ............................... 188/156, 72.8, 188/2 D, 158, 162; 74/502.4, 501.5 R

(56) References Cited

U.S. PATENT DOCUMENTS

| | | | |
|---|---|---|---|
| 4,629,043 A | * 12/1986 | Matsuo et al. ............... | 477/184 |
| 4,817,463 A | 4/1989 | Cameron | |
| 5,004,077 A | * 4/1991 | Carlson et al. ............. | 188/2 D |
| 5,485,764 A | * 1/1996 | Sugimoto et al. ............. | 74/535 |
| 5,590,744 A | * 1/1997 | Belmond ..................... | 188/265 |
| 6,244,394 B1 | * 6/2001 | Gutierrez et al. .......... | 188/72.8 |
| 6,513,632 B2 | * 2/2003 | Peter ........................... | 188/162 |
| 6,533,082 B2 | * 3/2003 | Gill et al. .................... | 188/156 |
| 2002/0100647 A1 | * 8/2002 | Miyakawa et al. ......... | 188/162 |
| 2002/0108816 A1 | * 8/2002 | Taniguchi .................... | 188/2 R |
| 2003/0047393 A1 | * 3/2003 | Gibson ........................ | 188/156 |

FOREIGN PATENT DOCUMENTS

| | | |
|---|---|---|
| DE | 19653961 A1 | 6/1998 |
| DE | 19913497 A1 | 9/2000 |
| EP | 0936112 | * 8/1999 |
| EP | 0936112 A1 | 8/1999 |
| FR | 2805507 | 8/2001 |
| FR | 2812056 | 1/2002 |
| JP | 200298179 | * 4/2002 |
| WO | WO 99/43968 | * 9/1999 |
| WO | WO 02/20324 | * 3/2002 |

* cited by examiner

Primary Examiner—Robert A. Siconolfi
Assistant Examiner—Devon Kramer
(74) Attorney, Agent, or Firm—Tarolli, Sundheim, Covell & Tummino L.L.P.

(57) ABSTRACT

A park brake system for vehicles is provided that has an actuator with an electric drive motor (36, 38) and an electronic control unit. A reduction gear has an input connected to the output of the electric motor and a pull force output member (56) for connection to mechanical brakes of the vehicle. The reduction gear has an input connected to the output of the electric motor. A command unit is connected to the electronic control unit. The reduction gear comprises a first reduction train and a second reduction train. The first reduction train includes a worm gear (42, 44) and the second reduction train includes a threaded spindle (46) and a screw nut (50) engaged with the spindle (46). The worm gear connects the spindle (46) to the output of the electric motor (36, 38). The pull force output member (56) is connected to the screw nut (50). The two-step reduction gear ensures the required high rate of reduction to generate high pull forces with a relatively compact electric motor. The worm gear used in the first reduction train has a high efficiency, and the threaded spindle and screw nut in the second reduction train allow for a self-locking feature.

14 Claims, 4 Drawing Sheets

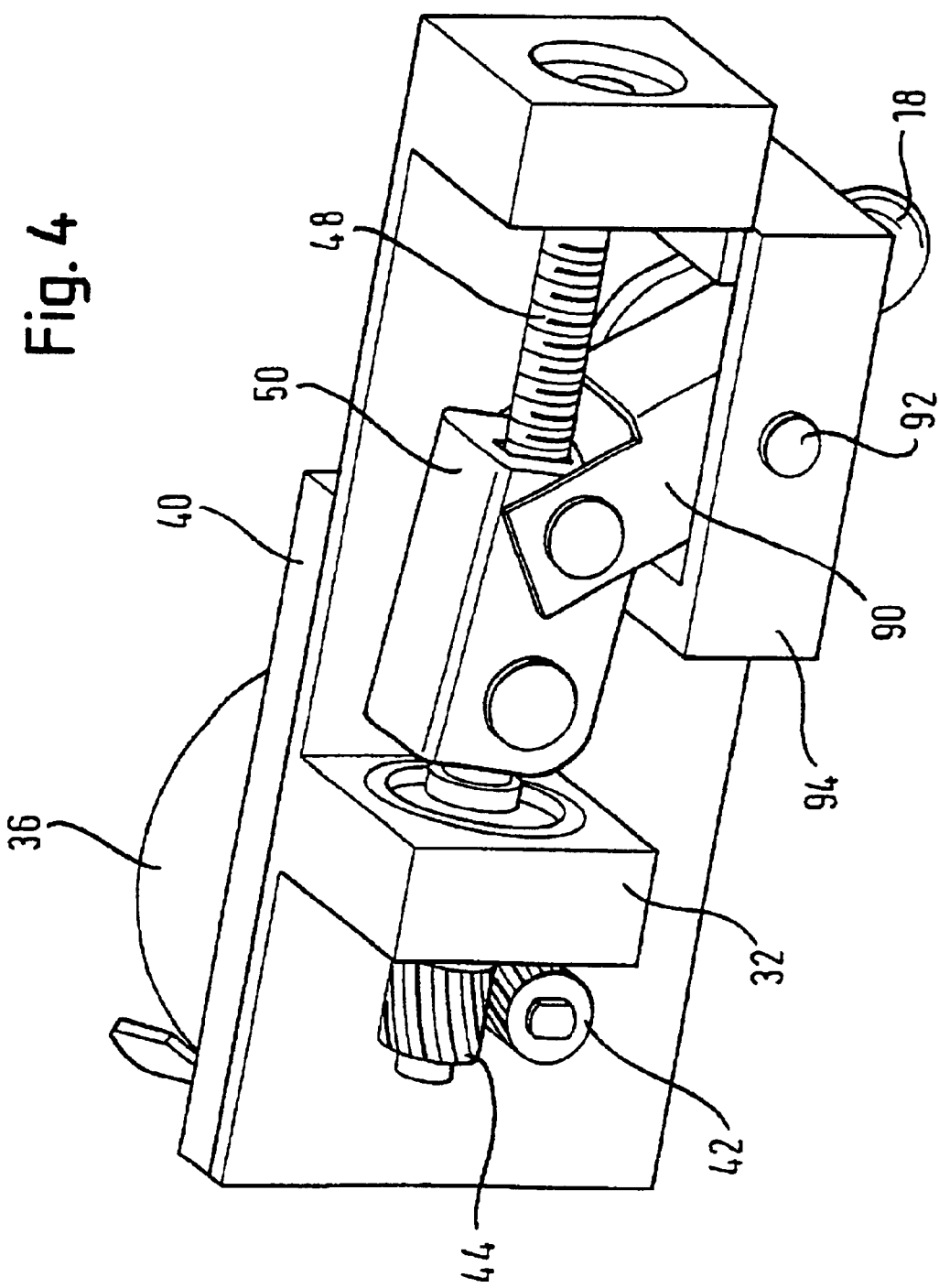

PARK BREAK SYSTEM FOR VEHICLES

The present invention relates to a park brake system for vehicles that comprises an actuator with an electric drive motor and an electronic control unit.

BACKGROUND OF THE INVENTION

Conventional park brakes in vehicles usually include a pair of disk or drum brakes at the rear wheels of the vehicle, a mechanical actuating member such as a manually operated lever or a park brake pedal, and a brake cable connecting the brakes with the actuating member.

More sophisticated vehicles have an electric drive that actuates the park brake in response to a manually operated electric switch that can be mounted in the vehicle's dash board. A park brake typically requires high actuation forces above 1000 N. Generating sufficiently high actuation forces with an electric drive normally requires the use of heavy and bulky electric motors and entails high consumption of electric power.

SUMMARY OF THE INVENTION

The present invention provides a park brake system for vehicles with an electric drive that uses a compact and light-weight electric motor, and that has a moderate consumption of electric power that permits a more flexible function.

According to the invention, a park brake system for vehicles is provided that has an actuator with an electric drive motor and an electronic control unit. A reduction gear has an input connected to the output of the electric motor and a pull force output member for connection to mechanical brakes of the vehicle. A command unit is connected to the electronic control unit. The reduction gear comprises a first reduction train and a second reduction train; the first reduction train includes a worm gear and the second reduction train includes a threaded spindle and a screw nut engaged with the spindle. The worm gear connects the spindle to the output of the electric motor. The pull force output member is connected to the screw nut. The two-step reduction gear ensures the required high rate of reduction to generate high pull forces with a relatively compact electric motor. The worm gear used in the first reduction train has a high efficiency, and the threaded spindle and screw nut in the second reduction train allow for a self-locking feature. Evidently, when the park brake is in the activated condition, it must remain in that condition even after ignition has been switched off and, therefore, without consumption of electric energy. Conventionally, some mechanical blocking means such as a latch would thus be required to maintain the park brake in an activated condition independent of the availability of electric current. In the present invention, however, the second reduction train can be easily designed with an inherent blocking function. By selecting an appropriate geometry for the screw thread of the spindle, a self-locking feature is achieved, i.e. transmission is possible in only one direction (from input to output). Although a reduction train with a spindle and screw nut typically has a poor efficiency, an overall high efficiency is achieved since the first reduction step has a high efficiency.

The pull force output member can be directly coupled to the screw nut if the required pull direction to activate the park brake is the same as the direction of screw nut movement, i.e. axially with respect to the spindle. If the required pull direction to activate the park brake is different from the direction of screw nut movement, some deflection means will be used.

According to a first embodiment of the invention, the pull force output member is connected to the screw nut through a flexible traction member deflected by a pulley, and the pull force output member is adapted for connection to a brake cable.

According to a second embodiment of the invention, the pull force output member is a pivotally mounted two-armed lever having a first arm connected to the screw nut and a second arm adapted for connection to a brake cable.

SHORT DESCRIPTION OF DRAWINGS

Further advantages and features of the invention will become apparent from the following description of a preferred embodiment with reference to the drawings. In the drawings:

FIG. 4 is a partial view of an alternative embodiment.

DETAILED DESCRIPTION OF PREFERRED EMBODIMENT

Figure 1:
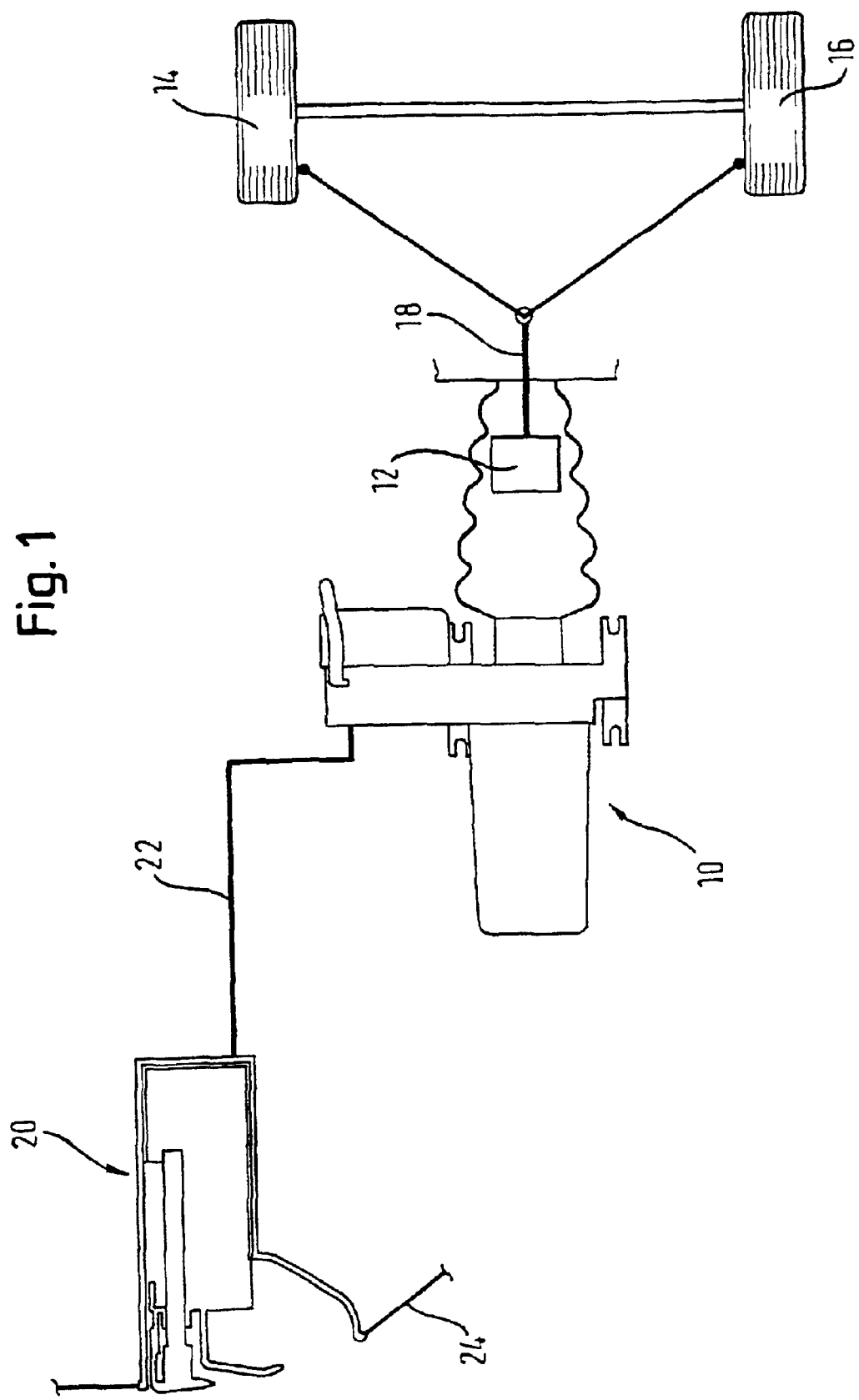
FIG. 1 is a diagrammatic view of the inventive park brake system.

With reference to FIG. 1, a park brake system is shown that generally includes an actuator 10 with an electric drive motor, a reduction gear and an output member 12, mechanical brakes on wheels 14, 16 of a vehicle, a brake cable 18 for connection of output member 12 to the brakes on wheels 14, 16, and a command unit 20 that is connected to the actuator 10 via line 22. The command unit 20 can be incorporated in a vehicle dashboard 24, for example.

Figure 2:
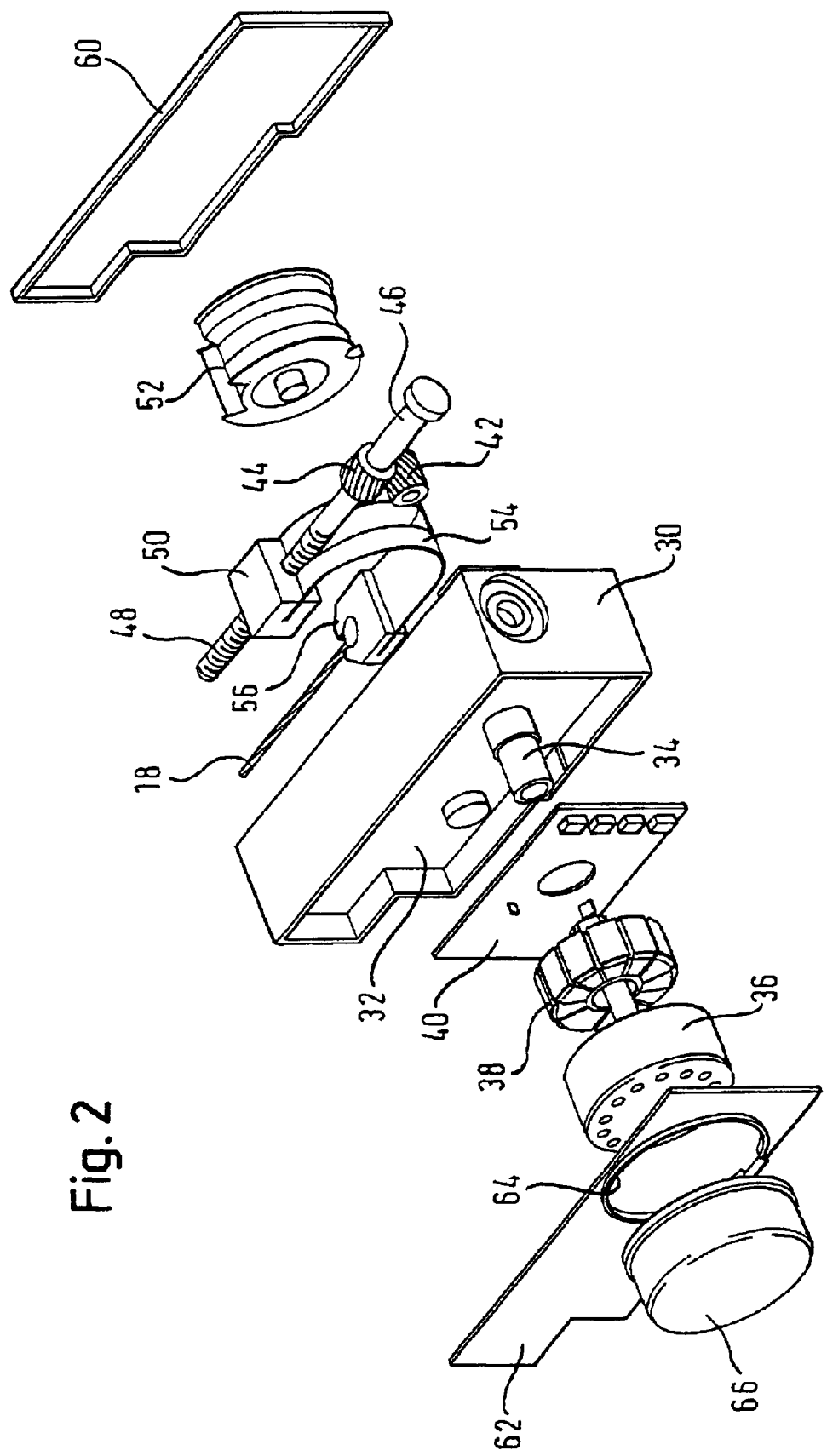
FIG. 2 is an explosive view of an actuator for the park brake system.

The actuator 10 (FIG. 2) has a generally parallelepipedal housing structure 30 molded of plastics with an intermediate internal wall 32. Wall 32 has an integrally molded tubular mounting structure 34 for a rotor shaft connected to a rotor 36 of an electric motor, the stator 38 of which is mounted on a printed circuit board 40 in turn mounded on and rigidly connected to wall 32 in a parallel relationship. The electric motor is of an external rotor, brushless DC type, e.g. a 4-phase DC motor.

Besides a number of power semiconductor elements connected to the windings of stator 38, the printed circuit board 40 accommodates components of an electronic control unit for driving the electric motor.

The electric motor with stator 38 and rotor 36, and the printed circuit board 40, are mounted on one side of intermediate wall 32. On the other side of wall 32, housing structure 30 accommodates a two-step reduction gear train. The first step of the reduction gear train is a worm gear, including a first worm wheel 42 mounted on the shaft of rotor 36 and a second worm wheel 44 mounted on a spindle 46 and engaged with worm wheel 42. The spindle 46 is rotatably mounted in housing structure 30 and has a threaded section 48. A screw nut 50 is engaged on the threaded section 48 of spindle 46 and is guided for movement within housing structure 30 in an axial direction of spindle 46. The spindle 46 and screw nut 50 constitute the second step of the two-step reduction gear.

A deflection pulley 52 is rotatably mounted on internal wall 32, and a flexible twintape traction member 54 extends along the outer periphery of pulley 52. Traction member 54 has a first end connected to screw nut 50 and a second end connected to a pull force output member 56 to which brake cable 18 is connected.

Housing structure 30 is open on both sides of intermediate wall 32, but has a pair of flat covers 60, 62 closing the spaces on both sides of wall 32. Cover 62, which is on the side of the electric motor, has a circular opening 64 through which rotor 36 projects outwardly of housing structure 30. A removable cover 66 is fitted over the projecting part of rotor 36.

Figure 3:
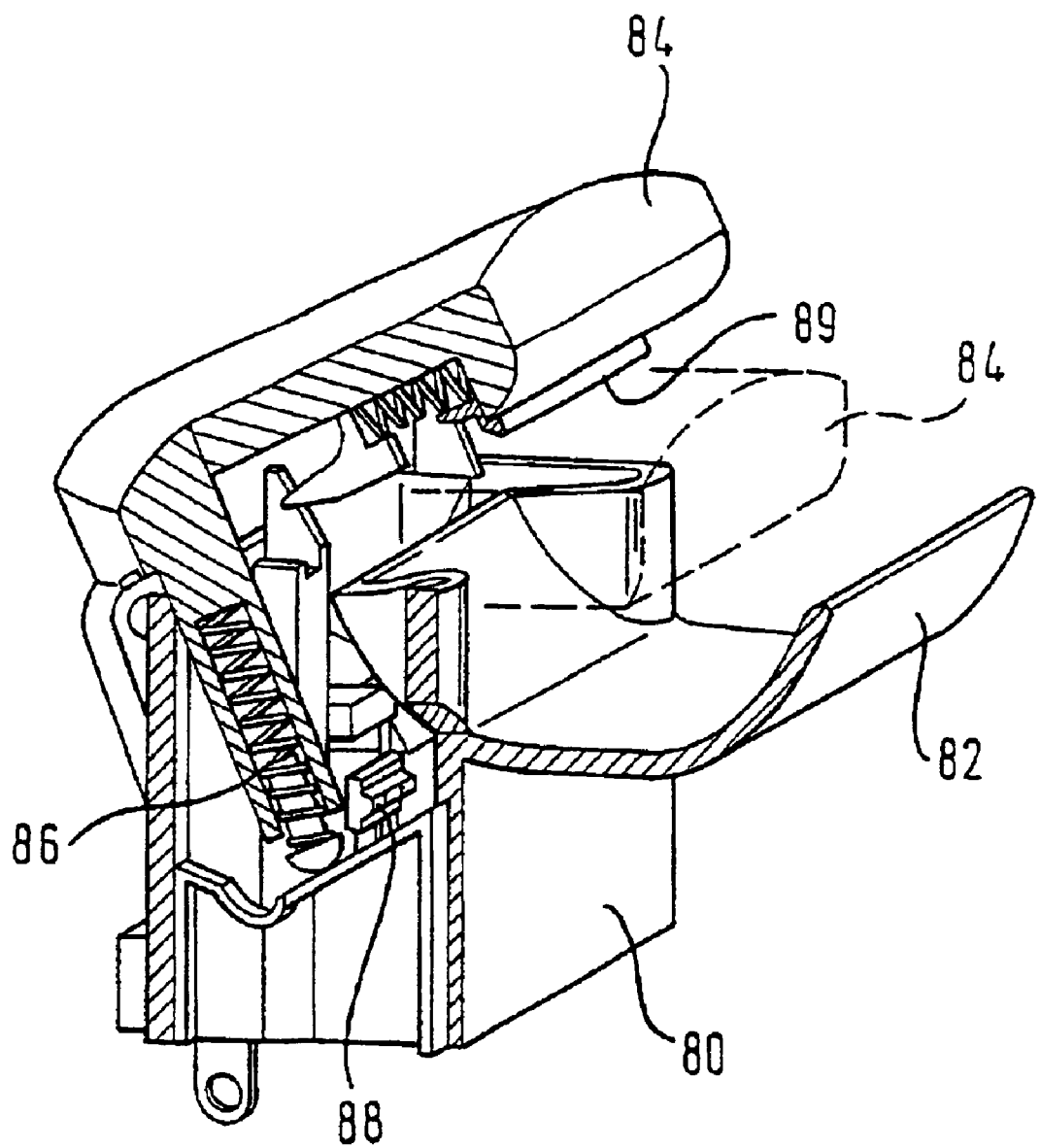
FIG. 3 is a partially sectioned view of a command unit for the park brake system.

With reference to FIG. 3, command unit 20 has a housing 80 with an integral grip cavity wall 82 for mounting in a recess of dashboard 24. A pull grip 84 is pivotally mounted on housing 80. Pull grip 84 is shown in FIG. 3 in a pivoted, actuated condition. A normal, non-actuated condition is shown in dashed lines. A spring-and-plunger arrangement 86 is provided to bias pull grip 84 to the normal non-actuated condition with considerable force so as to provide a haptic feedback to an operator, just as if pull grip 84 was mechanically connected to a conventional park brake cable. Command unit 20 incorporates an electric switch 88 actuated by pull grip 84 and connected to the electronic control unit of actuator 10. A latching mechanism is provided to latch pull grip 84 in the activated condition shown in FIG. 3. A release key 89 is mounted within pull grip 84 for disengagement of the latching mechanism. By arranging release key 89 within pull grip 84, it is protected from inadvertent actuation.

In the alternative embodiment shown in FIG. 4, a two-armed lever 90 is pivotally mounted at 92 in a bearing structure 94 integrally molded with wall 32. A first arm of lever 90 has an end connected to screw nut 50 engaged on the threaded part of spindle 48. A second arm of lever 90 has an end whereto brake cable 18 is connected.

In the normal, non-activated condition of the park brake, brake cable 18 is not tensioned, and actuator 10 is inactive. This is the normal drive condition for the vehicle.

To operate the park brake, the vehicle driver would localize and operate the pull grip 84 as if it was the control member of a conventional and mechanically operated park brake. Closure of the electric switch 88 would instruct the electronic control unit within actuator 10 to activate the electric drive motor. The reduction gear would convert the output of the electric drive motor to appropriate tension applied to brake cable 18 to activate wheel brakes 14, 16. After a predetermined position of screw nut 50 is reached, the electronic control unit deactivates the electric drive motor. The second step of the reduction gear being self-locking, the park brake now remains activated even without any consumption of electric energy.

To release the park brake, the operator would activate the release key 89, thereby unlatching pull grip 84. Pull grip 84 would be forced by spring-and-plunger arrangement 86 to return to its normal non-actuated position, thereby deactivating switch 88. Deactivation of switch 88 would cause actuator 10 to release the park brake by appropriate reverse operation of the electric drive motor.

What is claimed is:

1. A park brake system for a vehicle comprising:
    an actuator with an electric drive motor having an output and an electronic control unit,
    a reduction gear having an input connected to the output of said electric motor and a pull force output member for connection to mechanical brakes of the vehicle, and
    a command unit connected to said electronic control unit;
    wherein said reduction gear comprises a first reduction train and a second reduction train, said first reduction train including a worm gear and said second reduction train including a threaded spindle and a screw nut engaged with said spindle, said worm gear connecting said spindle to the output of said electric motor, and said pull force output member being a pivotally mounted two-armed lever having a first arm directly connected to said screw nut and a second arm directly connected to a brake cable, said first and second arms being located at opposed ends of said lever and are rigidly connected to each other during both an activated condition of the brake cable and during a released condition of the brake cable.

2. The park brake system of claim 1, wherein said electric drive motor is a high torque brushless DC motor.

3. The park brake system of claim 1, wherein said electric drive motor has an outer rotor and a removable cover is fitted over said rotor.

4. A park brake system for a vehicle comprising:
    an actuator with an electric drive motor having an output and an electronic control unit,
    a reduction gear having an input connected to the output of said electric motor and a pull force output member for connection to mechanical brakes of the vehicle, and
    a command unit connected to said electronic control unit;
    said reduction gear comprising a first reduction train and a second reduction, train said first reduction train including a worm gear and said second reduction train including a threaded spindle and a screw nut engaged with said spindle, said worm gear connecting said spindle to the output of said electric motor,
    said pull force output member being connected to said screw nut, and
    a housing structure having an intermediate wall and a plurality of side walls extending from said intermediate wall and defining an open space on both sides of said intermediate wall, and a pair of covers connected to said side walls for closing the spaces on both sides of said intermediate wall.

5. The park brake system of claim 4, wherein said drive motor and said reduction gear are mounted on opposite sides of said intermediate wall.

6. The park brake system of claim 4 wherein said intermediate wall is integrally molded with a tubular mounting structure for said spindle and for said screw nut.

7. The park brake system of claim 4, wherein said intermediate wall is integrally molded with a tubular mounting structure for a rotor of said electric drive motor.

8. A park brake system for a vehicle comprising:
    an actuator with an electric drive motor having an output and an electronic control unit,
    a reduction gear having an input connected to the output of said electric motor and a pull force output member for connection to mechanical brakes of the vehicle, and
    a command unit connected to said electronic control unit;
    said reduction gear comprising a first reduction train and a second reduction, train said first reduction train including a worm gear and said second reduction train including a threaded spindle and a screw nut engaged with said spindle, said worm gear connecting said spindle to the output of said electric motor,
    said pull force output member being connected to the screw nut,
    a housing structure with an intermediate wall for mounting said drive motor and said spindle,
    said drive motor and said reduction gear are mounted on opposite sides of said intermediate wall.

9. A park brake system for a vehicle comprising:
    an actuator with an electric drive motor having an output and an electronic control unit, a reduction gear having an input connected to the output of said electric motor and a pull force output member for connection to mechanical brakes of the vehicle, and a command unit connected to said electronic control unit;

said reduction gear comprising a first reduction train and a second reduction train, said first reduction train including a worm gear and said second reduction train including a threaded spindle and a screw nut engaged with said spindle, said worm gear connecting said spindle to the output of said electric motor, said pull force output member being connected to the screw nut, said command unit comprising an electric switch, a pull grip for operating said switch, a latch mechanism for latching said pull grip in an actuated position and a release key to disengage said latch mechanism.

10. The park brake system of claim 9 wherein said pull grip is spring-loaded to a normal release position by a spring mechanism that provides a haptic feedback to an operator on movement of said pull grip to said actuated position.

11. A park brake system for a vehicle comprising:

an actuator with an electric drive motor having an output and an electronic control unit, a reduction gear having an input connected to the output of said electric motor and a pull force output member for connection to mechanical brakes of the vehicle, and a command unit connected to said electronic control unit;

said reduction gear comprising a first reduction train and a second reduction train, said first reduction train including a worm gear and said second reduction train including a threaded spindle and a screw nut engaged with said spindle, said worm gear connecting said spindle to the output of said electric motor, said pull force output member being connected to said screw nut through a flexible traction member deflected by a pulley.

12. The park brake system of claim 11 wherein said pull force output member is adapted for connection to a brake cable.

13. The park brake system of claim 11 wherein said electric drive motor has an outer rotor and a removable cover fitted over said rotor.

14. The park brake system of claim 11 wherein said electric drive motor is a high torque brushless DC motor.

* * * * *

UNITED STATES PATENT AND TRADEMARK OFFICE
CERTIFICATE OF CORRECTION

PATENT NO. : 6,907,965 B2
DATED : June 21, 2005
INVENTOR(S) : Cornelius Peter

It is certified that error appears in the above-identified patent and that said Letters Patent is hereby corrected as shown below:

Title page,
Item [54], Title, "PARK BREAK SYSTEM FOR VEHICLES," should read
-- PARK BRAKE SYSTEM FOR VEHICLES --.

Signed and Sealed this

First Day of November, 2005

JON W. DUDAS
*Director of the United States Patent and Trademark Office*